Patented Apr. 27, 1937

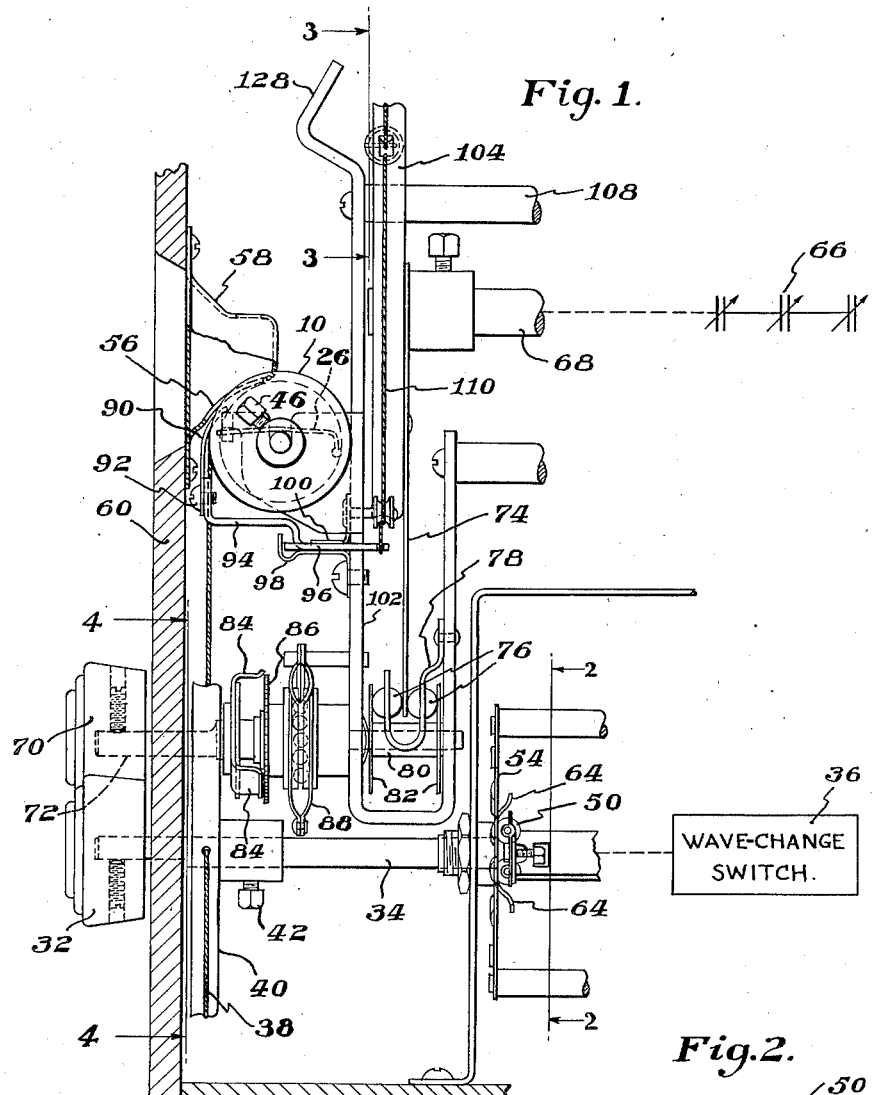

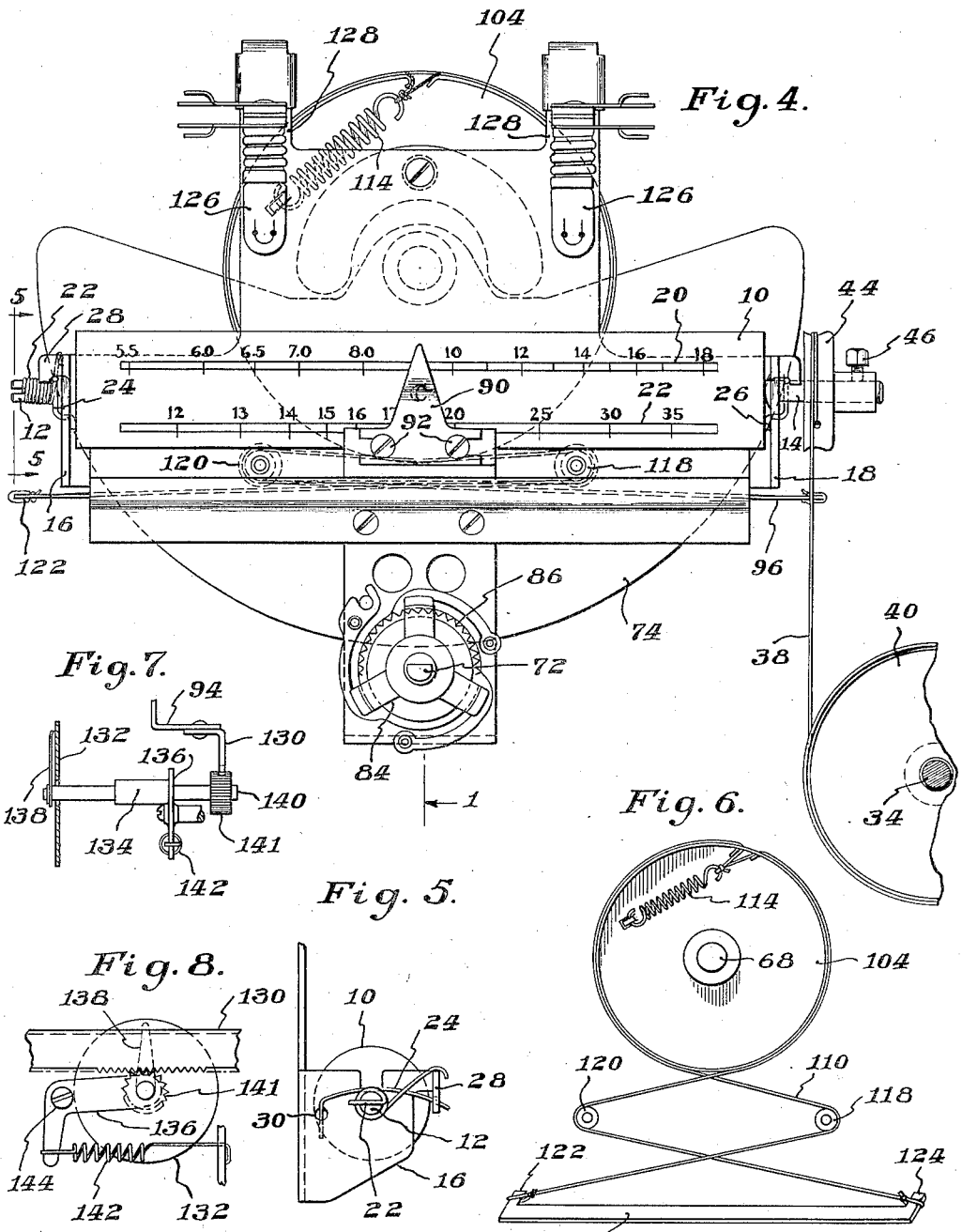

2,078,270

UNITED STATES PATENT OFFICE 2,078,270

INDICATING AND CONTROL DEVICE

William E. Newman, Moorestown, N. J., assignor to Radio Corporation of America, a corporation of Delaware Application April 30, 1935, Serial No. 19,125

1 Claim. (Cl. 116—124.1)

My invention relates to improvements in indicating and control devices.

One of the objects of my invention is to provide an improved indicating and control device adapted particularly for all-wave radio receivers to adjust the same for reception on selected bands over a predetermined frequency range, and to provide means for indicating the particular band for which the receiver is adjusted as well as the particular frequency or station in such band to which the receiver is tuned.

Another object of my invention is to provide an improved indicating and control device of the character referred to which is relatively simple in construction and reliable in operation, and which can be constructed as a unit and applied readily to a radio receiver of conventional design.

Other objects and advantages will hereinafter appear.

In accordance with my invention, a dial in the form of a drum is supported for rotation about its axis and is provided with a plurality of scales spaced circumferentially about its surface and parallel to the drum axis, each scale being for a given band in the entire frequency range over which the receiver operates. An indicating element in the form of a pointer is supported for movement parallel to the drum axis and along the individual scales to show the particular frequency at which the receiver is adjusted. The dial drum is caused to rotate through connections from a shaft for the wavechange switch, the arrangement being such that when this switch is moved to any position for tuning over a certain band, the entire drum is rotated to the position to place the scale for this band in position adjacent to the indicating pointer. Only the pointer and the scale being used at the time are visible through a rectangular opening in a front panel. Suitable connections between the gang condenser for tuning and the indicating pointer cause the latter to move along the scales in correspondence with the various tuning positions of the condenser.

My invention resides in the improved construction of the character hereinafter described and claimed.

For the purpose of illustrating my invention, an embodiment thereof is shown in the drawings, wherein Figure 1 is a side elevational view, partly in section and partly broken away, of an indicating and control device constructed and operating in accordance with my invention;

Fig. 2 is a sectional view, the section being taken on the line 2—2 in Fig. 1;

Fig. 3 is a fragmentary, sectional view, the section being taken on the line 3—3 in Fig. 1;

Fig. 4 is a front elevational view, partly in section, the section being taken on the line 4—4 in Fig. 1;

Fig. 5 is a sectional view, the section being taken on the line 5—5 in Fig. 4;

Fig. 6 is a simplified, elevational view of the driving connections to the indicating pointer;

Fig. 7 is a fragmentary, side elevational view of a vernier device for embodiment in Figs. 1 and 2 as a modification; and Fig. 8 is an end elevational view, looking toward the left in Fig. 7.

In the drawings, the reference numeral 10 designates a dial in the form of a drum provided at its ends with studs 12 and 14 which are journaled in brackets 16 and 18, respectively, for supporting the drum for rotation about its axis. The drum is provided with a plurality of scales, such as the scales 20 and 21, spaced circumferentially about its surface and parallel to the drum axis. Each scale represents a different band in the entire frequency range over which the receiver can operate.

The drum 10 is urged to rotate in a clockwise direction, as viewed in Fig. 1, by a coil spring 22 on the stud 12, and held in tension by having one of its ends fixed to the bearing bracket 16 and its other end fixed with respect to the drum, for which purpose the end of the stud 12 is split or bifurcated to receive this end of the spring, as shown in Figs. 4 and 5.

The drum 10 is held in position for rotation by wire pieces 24 and 26 which extend over the studs 12 and 14 and are sprung into position as shown in Fig. 5. That is, one end of the piece 24 is caught under a projection 28 with which the bracket 16 is provided, and the other end of this piece is bent as shown in Fig. 4 and inserted into and locked under the edge of an opening 30 in the bracket 16. The wire piece 26 is similarly bent and secured in place on the bracket 18.

The receiver is adjusted for the different bands by rotating a knob 32 fixed on the end of a shaft 34 connected to a wave-change switch designated at 36. Connection is made between the drum 10 and the switch 36 through a cable 38 extending about and having one end thereof fixed to a pulley 40 secured to the shaft 34 by a set screw 42, and having its other end extending about and secured to a smaller pulley 44 secured to the stud 14 by a set screw 46. Upon rotation of the shaft 34 in a clockwise direction, as viewed in Fig. 4, the cable 38 is let out to the pulley 44 so that the drum 10 can rotate under the action of the coil spring 22. Upon rotation of the shaft 34 in the opposite direction, the cable 38 is wound on the pulley 40 to cause opposite rotation of the drum against the action of the coil spring.

For the purpose of holding the drum 10 in its various positions of adjustment, a member 48 of spring steel is fixed for rotation with the shaft 34, and is provided at its ends with rollers 50 which seat in recesses 52 in the adjacent face of a fixed plate 54. The arrangement is such that when the switch 36 is in any of its operating positions, the corresponding scale on the drum 10 is visible through an opening 56 in an escutcheon plate 58 arranged and secured as shown to a front panel 60. The seating of the rollers 50 in the recesses 52 under the spring action of the member 48 is sufficient to prevent rotation of the drum 10 and the shaft 34 under the action of the coil spring 22, when the knob 32 is released. A projection 62, fixed for rotation with the shaft 34, extends through an opening in the member 48, as shown in Fig. 2, and is arranged to strike stops 64 with which the plate 54 is provided, to prevent rotation of the shaft 34 beyond the extreme positions in either direction.

A gang condenser, represented at 66, is adjusted upon rotation of a shaft 68 by turning a knob 70 fixed on the end of a shaft 72. Connection between the shafts 68 and 72 is made through a plate 74 fixed to the shaft 68 and having its outer edge disposed between balls 76 which are supported for free rotation but against bodily movement in a race member 78. A spool 80 is provided with ends 82 of spring material which operate to hold the balls 76 pressed against the respective opposite faces of the plate 74.

The shaft 72 is movable axially to the right, as viewed in Fig. 1, to cause engagement of the complementary clutch parts 84 and 86 so that the spool 80 is connected directly to the shaft 72. The only reduction between the shafts 68 and 72 is then through the balls 76 and the plate 74. When the knob 70 is pulled outwardly to the left, as viewed in Fig. 1, the clutch parts 84 and 86 are disengaged to cause the spool 80 to be driven from the shaft 72 through a ball reduction device 88.

The specific construction of the connecting means between shafts 68 and 72 forms no part of my present invention, and is disclosed in detail in my copending application Serial No. 722,849, filed April 28, 1934.

An indicating element or pointer 90 is fixed by stud bolts 92 to an arm 94 bent as shown in Fig. 1 and extending laterally outwardly from a flat bar 96 supported by and slidable between complementary guideway pieces 98 and 100 secured to a support 102. The pointer 90 is thus supported for movement parallel to the axis of rotation of the drum 10 and along the individual scales thereon.

The pointer 90 is caused to move along the particular scale in position in accordance with rotation of the condenser shaft 68 as the knob 70 is turned. For this purpose, a pulley 104 is fixed to the shaft 68 and is provided with an arcuate slot 106 concentric about the shaft 68 and through which a rod 108 of the supporting structure for the condenser extends. The center of a cable 110 is inserted, from the outside, into an opening 112 in the rim of the pulley, and is looped around and fixed to an end of a spring 114. The other end of the spring is anchored as shown in Fig. 3 to a projection 116 which may be struck out from the face of the pulley 104. Referring to Figs. 3, 4 and 6, the left half of the cable 110 is wrapped partly about the pulley 104 in a counter-clockwise direction and is then passed in counter-clockwise direction about a fixed idler pulley 118 and fixed to the end 122 of the member 96. The right half of the cable is wrapped partly about the pulley 104 in a clockwise direction, and then in a counter-clockwise direction about a fixed idler pulley 120, and is fixed to the end 124 of the member 96.

The spring 114 is sufficiently in tension to keep the cable taut at all times. From the foregoing it will be seen that as the condenser shaft 68 and the pulley 104 are rotated in the clockwise direction, the cable will be let out to the end 124 of the member 96 and pulled in an equal amount from the other end of this member, thereby causing sliding movement of the pointer 90 to the right. Upon rotation of the condenser shaft 68 and the pulley 104 in the opposite direction, the reverse action will take place, to cause sliding movement of the pointer 90 to the left. The arrangement, in other words, is such that the pointer 90 is caused to move in the correct direction and to the proper position along the scale to correspond to the tuning adjustment of the condenser 66.

The edges at opposite ends of the arcuate slot 106 in the pulley are engaged by the post 108 to provide a stop for the parts when the condenser is in its extreme positions in either direction.

The drum 10 is illuminated by lamps 126 supported from extensions 128 with which the support 102 is provided.

It is proposed to identify the various scales on the drum 10 by letters which appear below the same, through the opening 56, when the respective scales are moved into position upon actuation of the wave-change switch. For example, in Fig. 4, the scale 20 for the broadcast band is shown identified by the letter "C", which is visible when this scale is in use, except when the pointer 90 is in its central position, as shown.

For the purpose of indicating incremental movement of the pointer 90, it is proposed to provide the arm 94 with a rack 130, as shown in Figs. 7 and 8, and drive a vernier device from this rack. The vernier device may comprise a vernier dial 132, a bushing or bearing 134 carried by an L-shape member 136, and a vernier pointer 138 fixed on one end of a shaft 140 extending through the bearing 134. A pinon 141, fixed to the other end of the shaft 140, is held in mesh with the rack 130 by a tensioned spring 142 which urges the member 136 in counter-clockwise direction about a fixed pivot 144. The pitch diameter of the pinion 141 is relatively small, so that the vernier pointer 138 makes one complete revolution for a relatively small travel of the indicating pointer 90.

From the foregoing it will be seen that I have provided an improved construction for an indicating and control device particularly adapted for all-wave receivers, and in which only one scale is visible at a time, the device being reliable in operation and relatively simple in construction, and adaptable for application as a unit to radio receivers of conventional design. It will be understood that various modifications, within the conception of those skilled in the art, are possible without departing from the spirit of my invention or the scope of the claim.

I claim as my invention:

A tuning shaft, a tuning indicator in the form of a drum supported for rotation about an axis spaced from and normal to that of said tuning shaft and provided with a plurality of scales spaced circumferentially about its surface and parallel to said axis, a supporting plate having a guideway parallel to said axis, a tuning indicating pointer common with respect to said scales and slidably supported in said guideway for movement parallel to said axis and along the individual scales, means for rotating said drum to selectively place said scales in position adjacent to said pointer, a pulley on said tuning shaft, a cord about said pulley and having its ends fixed respectively to said pointer to move said pointer in said guideway in a direction determined by the direction of rotation of said shaft, and means including a driving shaft for rotating said tuning shaft, said driving shaft being located midway between the ends of said drum and on the side of said drum axis remote from said tuning shaft.

WILLIAM E. NEWMAN.